United States Patent
Shiratake et al.

(10) Patent No.: US 11,440,991 B2
(45) Date of Patent: Sep. 13, 2022

(54) POLYCARBONATE RESIN COMPOSITION, PRODUCTION METHOD THEREFOR, AND OPTICAL LENS

(71) Applicant: MITSUBISHI GAS CHEMICAL COMPANY, INC., Tokyo (JP)

(72) Inventors: Munenori Shiratake, Ibaraki (JP); Kentaro Ishihara, Tokyo (JP); Koji Hirose, Tokyo (JP); Shinya Ikeda, Tokyo (JP); Noriyuki Kato, Tokyo (JP); Mitsuteru Kondo, Tokyo (JP); Shoko Suzuki, Tokyo (JP); Kensuke Oshima, Tokyo (JP); Shuya Nagayama, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 186 days.

(21) Appl. No.: 16/961,592

(22) PCT Filed: Jan. 18, 2019

(86) PCT No.: PCT/JP2019/001375
§ 371 (c)(1),
(2) Date: Jul. 10, 2020

(87) PCT Pub. No.: WO2019/146507
PCT Pub. Date: Aug. 1, 2019

(65) Prior Publication Data
US 2021/0363295 A1 Nov. 25, 2021

(30) Foreign Application Priority Data
Jan. 23, 2018 (JP) .............................. JP2018-009024

(51) Int. Cl.
| | |
|---|---|
| C08G 64/06 | (2006.01) |
| C08K 5/134 | (2006.01) |
| C08K 5/524 | (2006.01) |
| C08L 69/00 | (2006.01) |
| G02B 1/04 | (2006.01) |

(52) U.S. Cl.
CPC .............. *C08G 64/06* (2013.01); *C08K 5/134* (2013.01); *C08K 5/524* (2013.01); *C08L 69/00* (2013.01); *G02B 1/041* (2013.01); *C08L 2203/16* (2013.01); *C08L 2203/30* (2013.01)

(58) Field of Classification Search
USPC .......................... 528/196, 198, 298, 370, 371
See application file for complete search history.

(56) References Cited

U.S. PATENT DOCUMENTS

| | | |
|---|---|---|
| 2010/0048855 A1 | 2/2010 | Kato et al. |
| 2019/0241703 A1 | 8/2019 | Kato et al. |

FOREIGN PATENT DOCUMENTS

| | | | |
|---|---|---|---|
| EP | 2 918 621 A1 | | 9/2015 |
| JP | 06-25398 A | | 2/1994 |
| JP | 2017-020043 A | | 1/2017 |
| JP | 2017-179323 A | | 10/2017 |
| JP | 2017179323 A | * | 10/2017 |
| JP | 2018/104691 A | | 7/2018 |
| WO | 2007/142149 A1 | | 12/2007 |
| WO | 2009/014050 A1 | | 1/2009 |
| WO | 2018/016516 A1 | | 1/2018 |

OTHER PUBLICATIONS

JP02017179323A Yoshinari Ota, machine Translation, High-refractive-index polycarbonate resin and molding; (Year: 2021).*
International Search Report issued in International Pat. Appl. No. PCT/JP2019/001375, dated Apr. 2, 2019, along with an English translation thereof.
Extended European Search Report issued in European Patent Application No. 19743561.3 dated Feb. 16, 2021.

* cited by examiner

*Primary Examiner* — Terressa Boykin
(74) *Attorney, Agent, or Firm* — Greenblum & Bernstein, P.L.C.

(57) ABSTRACT

The present application provides a polycarbonate resin composition which has a high refractive index and a low Abbe number, and high thermal stability. The polycarbonate resin composition according to one embodiment of the present application includes a polycarbonate resin and an antioxidant, wherein the polycarbonate resin contains a constituent unit represented by general formula (1) (in general formula (1), X represents an alkylene group having 1-4 carbon atoms, and a and b each independently represent an integer of 1-10), and the antioxidant content is 1-3000 ppm.

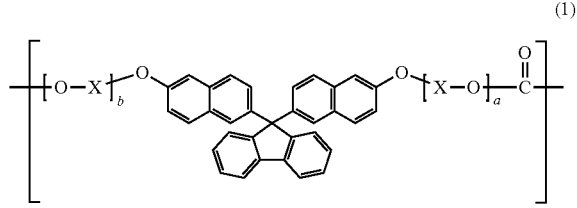

(1)

13 Claims, No Drawings

POLYCARBONATE RESIN COMPOSITION, PRODUCTION METHOD THEREFOR, AND OPTICAL LENS

FIELD OF THE INVENTION

The present invention relates to a polycarbonate resin composition and a method for producing the same. In addition, the present invention also relates to an optical lens comprising the polycarbonate resin composition.

BACKGROUND ART

Optical glass and optically-applicable resin compositions have been used as materials of optical lenses used in optical systems of various cameras such as cameras, film-integrated cameras and video cameras. Although optical glass is excellent in heat resistance, transparency, dimensional stability, chemical resistance and else, it has problems of high material cost, poor formability and low productivity.

In the meantime, an optical lens made from an optically-applicable resin composition is advantageous in that it can be mass-produced by injection molding. For example, a polycarbonate resin composition or the like is used in camera lenses. Due to current reduction in the weight, thickness and length of the products, however, there has been needs for development of a resin composition having a high refractive index. In general, an optical material having a higher refractive index can realize a lens element that has the same refractive index on a smaller curvature surface. Therefore, the aberration generated on this surface can be small. As a result, the number of the lenses can be reduced, the decentering sensitivity of the lens can be weakened and the thickness of the lens can be reduced to realize weight reduction.

Furthermore, a plurality of concave lenses and convex lenses are generally combined for aberration correction in an optical system of a camera. Specifically, chromatic aberration in a convex lens can be cancelled synthetically by combining it with a concave lens having chromatic aberration of the sign opposite to the convex lens. In this case, the dispersion of the concave lens needs to be high (i.e., a low Abbe number).

Accordingly, resins that can be adapted for optical lenses with a high refractive index and a low Abbe number have been developed. For example, Patent document 1 discloses that a copolymer of a bisphenol A polycarbonate structural unit and a structural unit represented by Formula (E) below can enhance the refractive index. Patent document 1 describes that a refractive index of 1.62-1.64 and an Abbe number of 23-26 were achieved in the example. Such enhancement of the refractive index appears to owe to the structural unit represented by Formula (E).

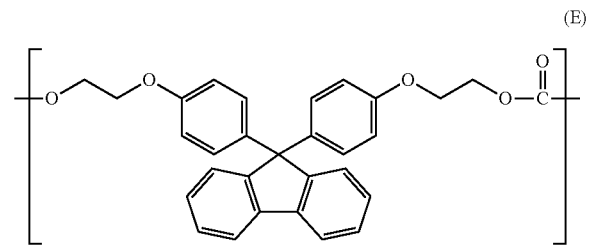

(E)

Furthermore, Patent document 2 discloses a copolymer of a polycarbonate resin comprising a structural unit having a fluorene skeleton and bisphenol A. While this document describes that a refractive index of 1.616-1.636 was achieved in the example, it does not mention that the Abbe number was low. Here, the structural unit disclosed in this document is different from the one represented by Formula (E).

Thus, a polycarbonate resin, a resin composition or an optical lens having a high refractive index and a low Abbe number have not yet been provided.

PRIOR ART DOCUMENTS

Patent Documents

Patent document 1: International Patent Application Publication WO2007/142149
Patent document 2: Japanese Unexamined Patent Application Publication No. H06-25398

SUMMARY OF INVENTION

Problems to be Solved by Invention

Since heat resistance is also required in recent electronic apparatuses, not only a high refractive index and a low Abbe number but also high thermal stability is required for an optical lens made from an optically-applicable resin composition which is to be used in such electronic apparatuses.

The problem to be solved by the present invention is to provide a polycarbonate resin composition which has a high refractive index and a low Abbe number, and which also has high thermal stability. Moreover, it is also an objective to provide a superior optical lens by using this resin composition.

Means for Solving Problem

The present inventors have gone through intensive investigation to solve the above-described problems, and as a result of which found that these problems can be solved with the following polycarbonate resin and optical lens, thereby accomplishing the present invention.

The present invention is, for example, as follows.
[1] A polycarbonate resin composition comprising a polycarbonate resin and an antioxidant, wherein the polycarbonate resin comprises a structural unit represented by General formula (1) below:

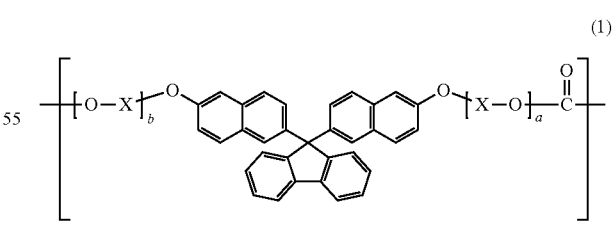

(1)

wherein, in General formula (1), X represents a C1-C4 alkylene group, and a and b each independently represent an integer of 1-10,
and the content of the antioxidant is 1-3000 ppm.
[2] The composition according to [1], wherein the antioxidant is a phosphite-based antioxidant and/or a phenol-based antioxidant.

[3] The composition according to [1] or [2], wherein the polycarbonate resin further comprises a structural unit represented by General formula (2) and/or (3) below:

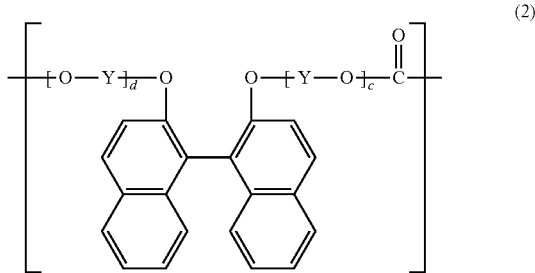

wherein, in General formula (2), Y represents a C1-C4 alkylene group, and c and d each independently represent an integer of 1-10; and

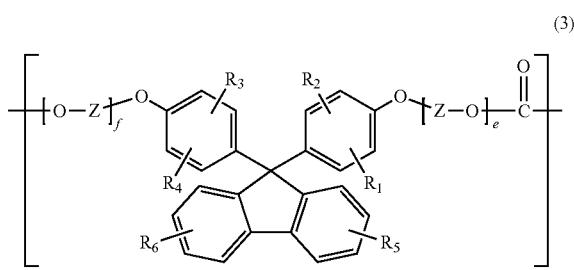

wherein, in General formula (3),
Z represents a C1-C4 alkylene group,
$R_1$-$R_6$ each independently represent a hydrogen atom, a C1-C20 alkyl group, a C1-C20 alkoxyl group, a C5-C20 cycloalkyl group, a C5-C20 cycloalkoxyl group, a C6-C20 aryl group or a C6-C20 aryloxy group, and
e and f each independently represent an integer of 0-5.

[4] The composition according to any one of [1]-[3], wherein, in General formula (1), X is a C2 alkylene group, and a and b are each independently 1.

[5] The composition according to either one of [3] and [4], wherein, in General formula (2), Y is a C2 alkylene group, and c and d are each independently 1.

[6] The composition according to any one of [3]-[5], wherein, in General formula (3), Z is a C2 alkylene group, $R_1$-$R_6$ are each independently a hydrogen atom or a phenyl group, and e and f are each independently 1.

[7] The composition according to any one of [1]-[6], wherein the proportion of the structural unit represented by General formula (1) is 10-50 mol % in the polycarbonate resin.

[8] The composition according to any one of [3]-[7], wherein the proportion of the structural unit represented by General formula (2) is 20-70 mol % in the polycarbonate resin.

[9] The composition according to any one of [3]-[8], wherein the proportion of the structural unit represented by General formula (3) is 10-70 mol % in the polycarbonate resin.

[10] The composition according to any one of [1]-[9], wherein the weight-average molecular weight of the polycarbonate resin is 10,000-100,000.

[11] A method for producing a polycarbonate resin composition, comprising:
preparing a polycarbonate resin comprising a structural unit represented by General formula (1) below:

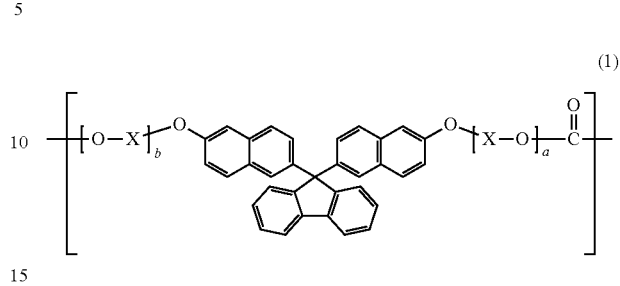

wherein, in General formula (1), X represents a C1-C4 alkylene group, and a and b each independently represent an integer of 1-10; and
adding an antioxidant to the polycarbonate resin and then melt-kneading the resultant.

[12] A molded article comprising the resin composition according to any one of [1]-[10].

[13] The molded article according to [12], wherein the molded article is an optical film.

[14] The molded article according to [12], wherein the molded article is an optical lens.

Effect of the Invention

The polycarbonate resin composition of the present invention has a high refractive index and a low Abbe number, and also has high thermal stability. Furthermore, the resin composition of the present invention can be used to obtain a superior optical lens.

DESCRIPTION OF THE EMBODIMENTS

Hereinafter, the present invention will be described in detail.

(1) Polycarbonate Resin Composition

A polycarbonate resin composition of the present invention comprises a polycarbonate resin comprising a prescribed structural unit and a prescribed amount of an antioxidant. By virtue of this structure, the polycarbonate resin composition of the present invention has a high refractive index and a low Abbe number and has high thermal stability as well. In addition, the polycarbonate resin composition of the present invention may further comprise any additive. Hereinafter, each of the constituent elements will be described.

(1-1) Polycarbonate Resin

The polycarbonate resin used for the present invention is a polycarbonate resin that has a structural unit represented by General formula (1) (hereinafter, also referred to as the "structural unit (1)").

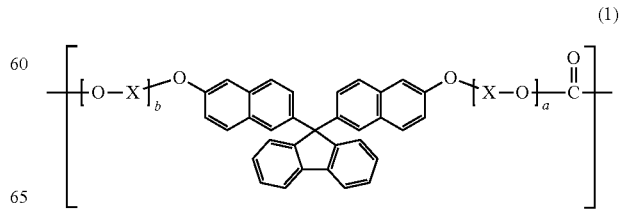

In General formula (1), X represents a C1-C4 alkylene group, and a and b each independently represent an integer of 1-10.

In a preferable aspect of the present invention, in General formula (1), X is a C2 alkylene group, and a and b are each independently 1.

Other than the structural unit (1), the polycarbonate resin used for the present invention may comprise one or more additional structural units. The additional structural unit is preferably a fluorene derivative unit, a binaphthol derivative unit or the like.

Specifically, the polycarbonate resin used for the present invention preferably further comprises a binaphthol derivative unit represented by General formula (2) below and/or a fluorene derivative unit represented by General formula (3) below.

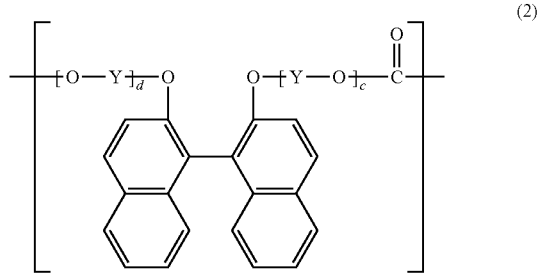

(2)

In General formula (2), Y represents a C1-C4 alkylene group, and c and d each independently represent an integer of 1-10.

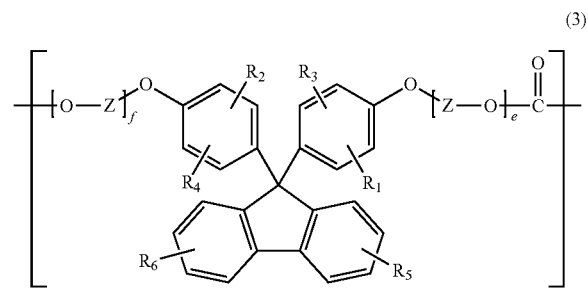

(3)

In General formula (3), Z represents a C1-C4 alkylene group, $R_1$-$R_6$ each independently represent a hydrogen atom, a C1-C20 alkyl group, a C1-C20 alkoxyl group, a C5-C20 cycloalkyl group, a C5-C20 cycloalkoxyl group, a C6-C20 aryl group or a C6-C20 aryloxy group, and e and f each independently represent an integer of 0-5.

In a preferable aspect of the present invention, in General formula (2), Y is a C2 alkylene group, and c and d are each independently an integer of 1. Moreover, in another preferable aspect of the present invention, in General formula (3), Z is a C2 alkylene group, $R_1$-$R_6$ are each independently a hydrogen atom or a phenyl group, and e and f are each independently 1. Furthermore, in General formula (3), the substitution positions of $R_1$-$R_4$ are preferably three positions away from the fluorene group, specifically, the positions indicated in the following chemical formula.

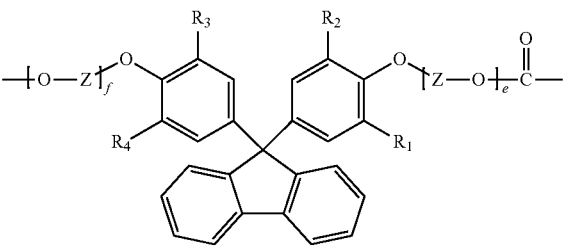

If the polycarbonate resin used for the present invention comprises a structural unit in addition to the structural unit represented by General formula (1), the proportion of the structural unit represented by General formula (1) above is preferably 10-50 mol %, more preferably 15-48 mol %, still more preferably 20-45 mol % and yet still more preferably 25-35 mol % in the polycarbonate resin. If the structural unit represented by General formula (2) is comprised, the proportion of the structural unit represented by General formula (2) above is preferably 10-70 mol %, more preferably 15-60 mol %, still more preferably 20-55 mol % and yet still more preferably 40-55 mol % in the polycarbonate resin. If the structural unit represented by General formula (3) is comprised, the proportion of the structural unit represented by General formula (3) above is preferably 10-70 mol %, more preferably 15-60 mol %, still more preferably 20-55 mol % and yet still more preferably 20-30 mol % in the polycarbonate resin.

The polycarbonate resin used for the present invention preferably comprises the structural units represented by General formulae (1) and (2), and more preferably consists essentially of the structural units represented by General formulae (1) and (2). The phrase "consists essentially of" herein means that the polycarbonate resin used for the present invention may contain additional structural unit within a range that does not impair the effect of the invention. For example, preferably 90% or more, more preferably 95% or more and still more preferably 98% or more of the structural units of the polycarbonate resin used for the present invention is the structural units represented by General formulae (1) and (2). If the polycarbonate resin used for the present invention comprises the structural units represented by General formulae (1) and (2), it is preferable that the proportion of the structural unit represented by General formula (1) is 10-50 mol % and the proportion of the structural unit represented by General formula (2) is 50-90 mol %.

The polycarbonate resin used for the present invention preferably comprises the structural units represented by General formulae (1) and (3), more preferably consists essentially of the structural units represented by General formulae (1) and (3). For example, preferably 90% or more, more preferably 95% or more and still more preferably 98% or more of the structural units of the polycarbonate resin used for the present invention is the structural units represented by General formulae (1) and (3). If the polycarbonate resin used for the present invention comprises the structural units represented by General formulae (1) and (3), it is preferable that the proportion of the structural unit represented by General formula (1) is 10-50 mol % and the proportion of the structural unit represented by General formula (3) is 50-90 mol %.

The polycarbonate resin used for the present invention preferably comprises the structural units represented by General formulae (1)-(3), and more preferably consists essentially of the structural units represented by General formulae (1)-(3). For example, preferably 90% or more, more preferably 95% or more and still more preferably 98% or more of the structural units of the polycarbonate resin used for the present invention is the structural units represented by General formulae (1)-(3). If the polycarbonate resin used for the present invention comprises the structural units represented by General formulae (1)-(3), it is preferable that the proportion of the structural unit represented by General formula (1) is 10-50 mol %, the proportion of the structural unit represented by General formula (2) is 10-60 mol %, and the proportion of the structural unit represented by General formula (3) is 10-40 mol %.

Where the polycarbonate resin used for the present invention comprises the structural units represented by General formulae (1) and (2), the structural units represented by General formulae (1) and (3), or the structural units represented by General formulae (1)-(3), there is no particular limitation as to how such structural units are comprised in the resin. In one aspect of the present invention, the polycarbonate resin may comprise a copolymer comprising the structural units represented by General formulae (1) and (2), the structural units represented by General formulae (1) and (3) or the structural units represented by General formulae (1)-(3), or may comprise a ternary resin or a binary resin comprising homopolymers of the respective structural units. Alternatively, it may be a blend of a copolymer comprising the structural units represented by General formulae (1) and (2) and a homopolymer comprising the structural unit represented by General formula (3), or a blend of a copolymer comprising the structural units represented by General formulae (1) and (2) and a copolymer comprising the structural units represented by General formulae (1) and (3).

The polycarbonate resin used for the present invention may comprise any of a random, block or alternating copolymerization structure.

The weight-average molecular weight (Mw) of the polycarbonate resin used for the present invention is preferably 10,000-100,000. Herein, "the weight-average molecular weight (Mw)" refers to a "weight-average molecular weight (Mw) in terms of polystyrene".

The weight-average molecular weight (Mw) in terms of polystyrene is more preferably 10,000-50,000, still more preferably 15,000-45,000, yet still more preferably 20,000-40,000 and particularly preferably 30,000-40,000.

A Mw less than 10,000 is unfavorable because the molded article becomes brittle. A Mw greater than 100,000 is unfavorable since taking out the produced resin becomes difficult due to a high melt viscosity, and injection molding in a molten state becomes difficult due to poor fluidity.

The refractive index (nD) of the polycarbonate resin used for the present invention at a temperature of 23° C. and a wavelength of 589 nm is preferably 1.635-1.695, more preferably 1.640-1.690, still more preferably 1.645-1.685 and particularly preferably 1.660-1.685. Since the refractive index (nD) of the polycarbonate resin used for the present invention is high, it is suitable as an optical lens material. The refractive index can be measured for a film with a thickness of 0.1 mm by using an Abbe refractometer according to the method of JIS-K-7142.

The Abbe number (v) of the polycarbonate resin used for the present invention is preferably 24 or less, more preferably 22 or less and still more preferably 20 or less. An Abbe number can be calculated from the refractive indexes at wavelengths of 486 nm, 589 nm and 656 nm at 23° C. by employing the following equation.

$$v=(nD-1)/(nF-nC)$$

nD: Refractive index at wavelength of 589 nm nC: Refractive index at wavelength of 656 nm nF: Refractive index at wavelength of 486 nm (1-2) Antioxidant The polycarbonate resin composition of the present invention comprises 1-3000 ppm of an antioxidant. The amount of the antioxidant is preferably 300-2800 ppm, more preferably 500-2500 ppm and still more preferably 500-2000 ppm. By making the amount of the antioxidant to be 1 ppm or more, it becomes effective in enhancing the thermal stability. On the other hand, by making the amount of the antioxidant to be 3000 ppm or less, an increase in the b value, a decrease in the refractive index, a decrease in Tg and a decrease in total light transmittance caused by an excessive amount of the antioxidant can be suppressed. Herein, "ppm" refers to "mass ppm".

As the antioxidant, a single type of antioxidant or a combination of multiple types of antioxidants may be used. If multiple types of antioxidants are to be used, the total amount of the antioxidants may be adjusted to lie within the aforementioned range.

Examples of the antioxidant used for the present invention include a phosphite-based antioxidant, a phenol-based antioxidant, a sulfur-based antioxidant, an epoxy-based antioxidant and a hindered amine-based antioxidant. In particular, a phosphite-based antioxidant or a phenol-based antioxidant is preferable, and combinational use of a phosphite-based antioxidant and a phenol-based antioxidant is more preferable. Examples of the phosphite-based antioxidant include, but not limited to, tricresyl phosphite, tris(2-ethylhexyl) phosphite, tridecyl phosphite, trilauryl phosphite, tris(tridecyl)phosphite and trioleyl phosphite, and Adekastab PEP-8, Adekastab PEP-36, Adekastab HP-10, Adekastab 2112, Adekastab 2112RG, Adekastab 1178, Adekastab 1500, Adekastab C, Adekastab 135A, Adekastab 3010 and Adekastab TPP manufactured by ADEKA. Here, Adekastab PEP36 (manufactured by ADEKA), Adekastab 1500 (manufactured by ADEKA) and Adekastab 2112 (manufactured by ADEKA) each have the following structure.

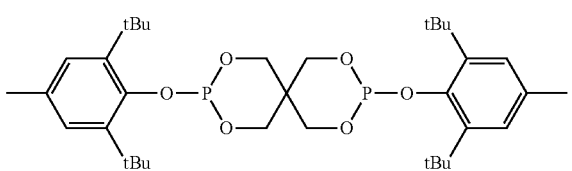

Adekastab PEP36

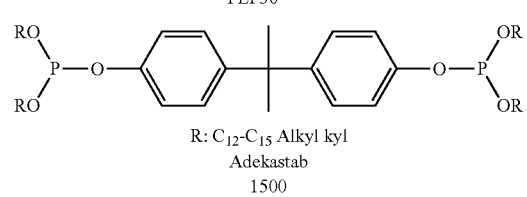

R: $C_{12}$-$C_{15}$ Alkyl kyl

Adekastab 1500

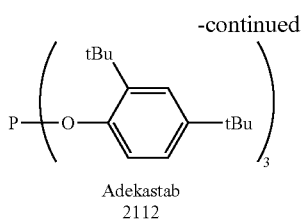

Adekastab
2112

Preferable examples of the phenol-based antioxidant include compounds represented by the following general formula.

integer of 1-4. Specific examples include, but not limited to, 1,6-hexanediol-bis[3-(3,5-di-tert-butyl-4-hydroxyphenyl)propionate], 2,2-thio-diethylenebis[3-(3,5-di-tert-butyl-4-hydroxyphenyl)propionate], tris(3,5-di-tert-butyl-4-hydroxybenzyl)-isocyanurate and N,N'-hexamethylenebis(3,5-di-tert-butyl-4-hydroxy-hydrocinnamate), and Adekastab AO-20, Adekastab AO-30, Adekastab AO-50, Adekastab AO-50F, Adekastab AO-60, Adekastab ASO-60GAO-80G and Adekastab AO-330 manufactured by ADEKA. Here, Adekastab AO60 (manufactured by ADEKA), Adekastab AO80 (manufactured by ADEKA) and Adekastab AO50 (manufactured by ADEKA) each have the following structure.

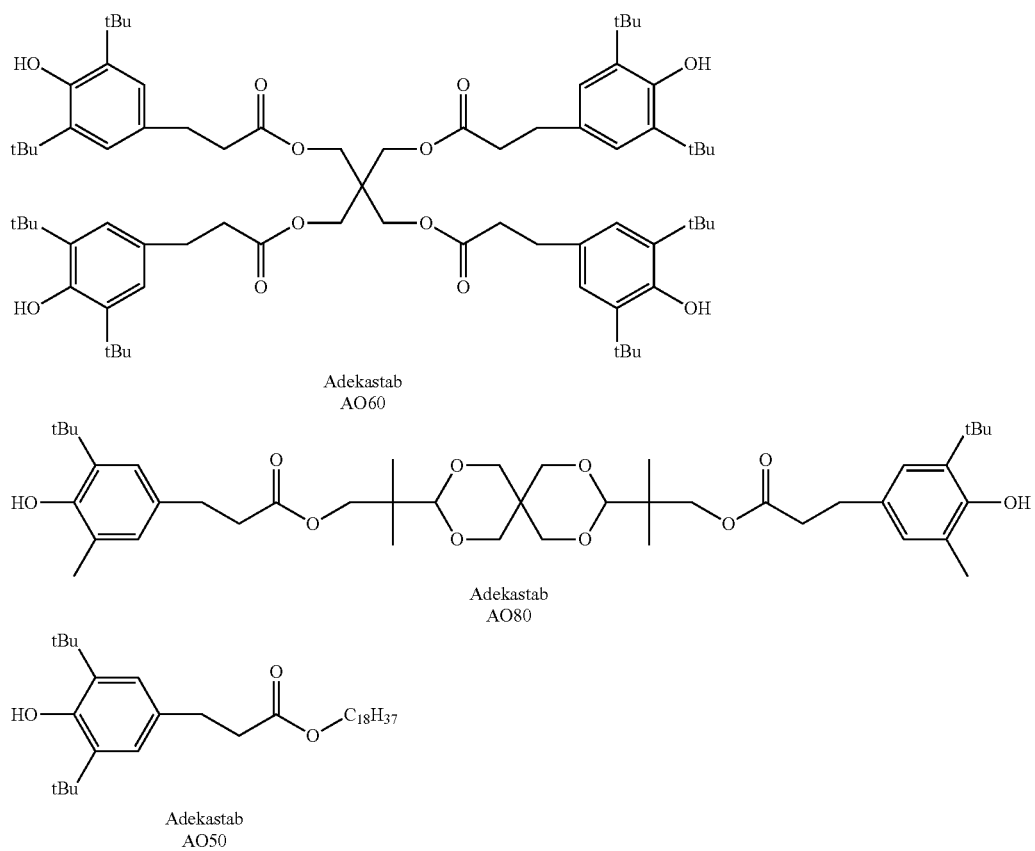

Adekastab AO60

Adekastab AO80

Adekastab AO50

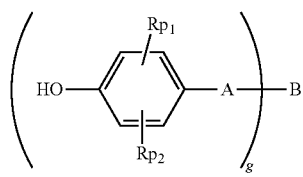

In the above general formula, $R_{p1}$ and $R_{p2}$ are each independently a C1-C10 hydrocarbon group. A is a functional group selected from an ester group, an ether group and an amide group and/or a C1-C20 hydrocarbon group that may comprise a phosphorus atom. B is a C1-C6 hydrocarbon group that may comprise an oxygen atom and/or a nitrogen atom, or a sulfur atom or a single bond. g represents an (1-3) Optional Additive In addition to the above-described polycarbonate resin, the polycarbonate resin composition of the present invention may comprise other resin. Examples of other resin include polyamide, polyacetal, polycarbonate, modified polyphenylene ether, polyethylene terephthalate and polybutylene terephthalate.

The polycarbonate resin composition of the present invention may be added with an optional additive such as a light stabilizer, a polymerized metal deactivator, a flame retardant, a lubricant, an antistatic agent, a surfactant, an antibacterial agent, a mold release agent, an ultraviolet absorber, a plasticizer, a compatibilizing agent, a bluing agent or the like.

As to a mold release agent, 90 wt % or more of it is preferably an ester resulting from an alcohol and a fatty acid. Specifically, examples of the ester resulting from an alcohol and a fatty acid include an ester resulting from a monohydric alcohol and a fatty acid, and a partial ester or a full ester resulting from a polyhydric alcohol and a fatty acid. The above-mentioned ester resulting from a monohydric alcohol and a fatty acid is preferably an ester resulting from a C1-C20 monohydric alcohol and a C10-C30 saturated fatty acid. Moreover, the partial ester or the full ester resulting from a polyhydric alcohol and a fatty acid is preferably a partial ester or a full ester resulting from a C1-C25 polyhydric alcohol and a C10-C30 saturated fatty acid.

Specifically, examples of the ester resulting from a monohydric alcohol and a saturated fatty acid include stearyl stearate, palmityl palmitate, butyl stearate, methyl laurate and isopropyl palmitate. Examples of the partial ester or the full ester resulting from a polyhydric alcohol and a saturated fatty acid include full esters or partial esters of monoglyceride stearate, monoglyceride stearate, diglyceride stearate, triglyceride stearate, monosorbitate stearate, monoglyceride behenate, monoglyceride caprate, monoglyceride laurate, pentaerythritol monostearate, pentaerythritol tetrastearate, pentaerythritol tetrapelargonate, propylene glycol monostearate, biphenyl biphenate, sorbitan monostearate, 2-ethylhexyl stearate and dipentaerythritol such as dipentaerythritol hexastearate. Among these esters, monoglyceride stearate, diglyceride stearate and triglyceride stearate are favorable. The content of such mold release agent is preferably in a range of 0.005-2.0 parts by weight, more preferably in a range of 0.01-0.6 parts by weight and still more preferably in a range of 0.02-0.5 parts by weight relative to 100 parts by weight of the polycarbonate resin.

The ultraviolet absorber is preferably at least one type of ultraviolet absorbers selected from the group consisting of a benzotriazole-based ultraviolet absorber, a benzophenone-based ultraviolet absorber, a triazine-based ultraviolet absorber, a cyclic iminoester-based ultraviolet absorber and cyanoacrylate-based ultraviolet absorber. Specifically, any one of the following ultraviolet absorbers may be used alone or two or more of them may be used in combination.

Examples of the benzotriazole-based ultraviolet absorber include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2N-benzotriazole-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazine-4-one), and 2-[2-hydroxy-3-(3,4,5,6-tetrahydrophthalimide methyl)-5-methylphenyl]benzotriazole.

Examples of the benzophenone-based ultraviolet absorber include 2,4-dihydroxy benzophenone, 2-hydroxy-4-methoxy benzophenone, 2-hydroxy-4-octoxy benzophenone, 2-hydroxy-4-benzyloxy benzophenone, 2-hydroxy-4-methoxy-5-sulfoxy benzophenone, 2-hydroxy-4-methoxy-5-sulfoxy trihyriderate benzophenone, 2,2'-dihydroxy-4-methoxy benzophenone, 2,2',4,4'-tetrahydroxy benzophenone, 2,2'-dihydroxy-4,4'-dimethoxy benzophenone, 2,2'-dihydroxy-4,4'-dimethoxy-5-sodium sulfoxy benzophenone, bis(5-benzoyl-4-hydroxy-2-methoxyphenyl) methane, 2-hydroxy-4-n-dodecyloxy benzophenone, and 2-hydroxy-4-methoxy-2'-carboxy benzophenone.

Examples of the triazine-based ultraviolet absorber include 2-(4,6-diphenyl-1,3,5-triazine-2-yl)-5-[(hexyl)oxy]-phenol, and 2-(4,6-bis(2,4-dimethylphenyl)-1,3,5-triazine-2-yl)-5-[(octyl)oxy]-phenol.

Examples of the cyclic iminoester-based ultraviolet absorber include 2,2'-bis(3,1-benzoxazine-4-one), 2,2'-p-phenylenebis(3,1-benzoxazine-4-one), 2,2'-m-phenylenebis(3,1-benzoxazine-4-one), 2,2'-(4,4'-diphenylene)bis(3,1-benzoxazine-4-one), 2,2'-(2,6-naphthalene)bis(3,1-benzoxazine-4-one), 2,2'-(1,5-naphthalene)bis(3,1-benzoxazine-4-one), 2,2'-(2-methyl-p-phenylene)bis(3,1-benzoxazine-4-one), 2,2'-(2-nitro-p-phenylene)bis(3,1-benzoxazine-4-one) and 2,2'-(2-chloro-p-phenylene)bis(3,1-benzoxazine-4-one).

Examples of the cyanoacrylate-based ultraviolet absorber include 1,3-bis-[(2'-cyano-3',3'-diphenylacryloyl)oxy]-2,2-bis[(2-cyano-3,3-diphenylacryloyl)oxy]methyl)propane, and 1,3-bis-[(2-cyano-3,3-diphenylacryloyl)oxy]benzene.

The content of the ultraviolet absorber is preferably 0.01-3.0 parts by weight, more preferably 0.02-1.0 parts by weight, and still more preferably 0.05-0.8 parts by weight relative to 100 parts by weight of the polycarbonate resin. As long as the added amount is within the aforementioned range, sufficient weatherability suitable for the usage can be imparted to the polycarbonate resin.

Examples of the bluing agent include Solvent Violet 13 (generic name) [CA. No (Color Index No) 60725, manufactured under the trade names of "Macrolex Violet B" by Lanxess, "Diaresin Blue G" by Mitsubishi Chemical Corporation and "Sumiplast Violet B" by Sumitomo Chemical Industry Co. Ltd.], Solvent Violet 14, Solvent Violet 31 (generic name) [CA. No 68210, manufactured under the trade name of "Diaresin Violet D" by Mitsubishi Chemical Corporation], Solvent Violet 33 [CA. No 60725, manufactured under the trade name of "Diaresin Blue J" by Mitsubishi Chemical Corporation], Solvent Violet 36 [CA. No 68210, manufactured under the trade name of "Macrolex Violet 3R" by Lanxess], Solvent Blue 45 [CA. No 61110, manufactured under the trade name of "Tetrazole Blue RLS" by Sandoz], Solvent Blue 94 (generic name) [CA. No 61500, manufactured under the trade name of "Diaresin Blue N" by Mitsubishi Chemical Corporation], Solvent Blue 97 (generic name) ["Macrolex Blue RR" manufactured by Lanxess], Solvent Blue 45 (generic name), Solvent Blue 87 (generic name) and Disperse Violet 28 (generic name). The bluing agent is added to cancel out the yellowness of the optical lens, where any one of the bluing agents may be used alone or two or more of them may be used in combination. The added amount of the bluing agent is preferably 0.00001-0.005 parts by weight, more preferably 0.00001-0.0005 parts by weight, and still more preferably 0.00001-0.0002 parts by weight relative to 100 parts by weight of the polycarbonate resin.

(1-4) Properties of Polycarbonate Resin Composition

The polycarbonate resin comprised in the polycarbonate resin composition of the present invention has a high refractive index and a low Abbe number. The polycarbonate resin composition of the present invention has substantially equal refractive index and Abbe number to those of the polycarbonate resin thereof. Herein, "substantially equal" means that the difference in the refractive index and the Abbe number between a polycarbonate resin and a polycarbonate resin composition comprising said polycarbonate resin are each ±10%, ±9%, ±8%, ±7%, ±6%, ±5%, ±4, ±3%, ±2% or ±1%. The polycarbonate resin composition of the present invention also has substantially equal total light transmittance and b value to those of the polycarbonate resin comprised in said composition.

The polycarbonate resin composition of the present invention has high thermal stability. Herein, "high thermal stability" means that the rate of change in the physical properties of the resin composition before and after heating is small. For example, the thermal stability can be evaluated by subjecting the polycarbonate resin composition to a heat retention test where the composition is dried at 110° C. for 5 hours and then retained for 10 minutes in a Koka-type flow tester that is heated to 285° C., and to a "PCT test" (Pressure Cooker Test) to determine the rates of change in the physical properties after the test. PCT test can be carried out by retaining an injection-molded article having a diameter of 50 mm and a thickness of 3 mm under the conditions of 120° C., 0.2 Mpa and 100% RH for 20 hours. The polycarbonate resin in the polycarbonate resin composition of the present invention has a molecular-weight retaining rate of 89% or more after the heat retention test and a molecular-weight retaining rate of 95% or more after the PCT test. Moreover, the increase in the b value of the polycarbonate resin of the present invention is 15% or less after the heat retention test.

The b value of the polycarbonate resin composition of the present invention is preferably 5.5 or less. The smaller the b value is, the weaker the yellowness and the better the hue are.

The amount of the residual phenol comprised in the polycarbonate resin composition of the present invention is preferably 500 ppm or less, more preferably 300 ppm or less and still more preferably 100 ppm or less. While the amount of the residual phenol comprised in the polycarbonate resin composition of the present invention is preferably as small as possible, the lower limit value thereof is, for example, 1 ppm or more, 10 ppm or more or 70 ppm or more.

The amount of the residual diphenyl carbonate (DPC) comprised in the polycarbonate resin composition of the present invention is preferably 500 ppm or less, more preferably 300 ppm or less, still more preferably 200 ppm or less and yet still more preferably 100 ppm or less. While the amount of the residual diphenyl carbonate comprised in the polycarbonate resin composition of the present invention is preferably as small as possible, the lower limit value thereof is, for example, 1 ppm or more, 5 ppm or more or 10 ppm or more.

(1-5) Usage

The polycarbonate resin composition of the present invention can be used to produce a molded optical article. Such a molded optical article can be produced, for example, by any method such as an injection molding process, a compression molding process, an extrusion molding process or a solution casting process. Since the polycarbonate resin composition of the present invention is excellent in moldability and heat resistance, it can particularly advantageously be used for an optical lens that requires injection molding. Upon molding, the polycarbonate resin composition of the present invention may be used by mixing with other polycarbonate resin or polyester resin.

Since the polycarbonate resin composition of the present invention also has a high refractive index and a low Abbe number, it can advantageously be used as an optically-applicable molded article that is suitable for use as a structural material or a functional material of a transparent conductive substrate used in a liquid crystal display, an organic EL display, a solar cell or the like, or optical parts such as an optical disc, a liquid crystal panel, an optical card, a sheet, a film, an optical fiber, a connector, a vapor-deposited plastic reflection mirror, a display or the like, as well as an optical lens.

If necessary, the surface of a molded optical article may be provided with a coat layer such as an antireflection layer or a hardcoat layer. The antireflection layer may be a single or multiple layer, which may be either organic or inorganic, but preferably inorganic. Specifically, examples include oxides or fluorides such as silicon oxide, aluminum oxide, zirconium oxide, titanium oxide, cerium oxide, magnesium oxide and magnesium fluoride.

Besides injection molding, examples of the molding process include, but not limited to, compression molding, casting, rolling, extrusion molding and stretching.

If the polycarbonate resin composition of the present invention is to be used in injection molding, the glass transition temperature (Tg) is preferably 90-180° C., more preferably 95-175° C., still more preferably 100-170° C., yet still more preferably 130-170° C. and particularly preferably 135-150° C. If Tg is lower than 90° C., the temperature range of usage becomes narrow, which is unfavorable. If Tg exceeds 180° C., the melting temperature of the resin becomes high and thus decomposition and coloring of the resin are likely to be caused, which is unfavorable. If the glass transition temperature of the resin is too high, difference between the mold temperature and the glass transition temperature of the resin becomes large in a general-purpose mold temperature regulator. Therefore, for applications that require strict surface accuracy of the product, a resin having a glass transition temperature that is too high is difficult to use and thus unfavorable. Moreover, from the viewpoints of molding fluidity and molding heat resistance, the lower limit value of Tg is preferably 130° C. and more preferably 135° C., while the upper limit value of Tg is 160° C. and more preferably 150° C.

The total light transmittance of a molded optical article obtained by using the polycarbonate resin composition of the present invention is preferably 85% or more, and more preferably 88% or more. Total light transmittance of 85% or more is comparable to that of a bisphenol A polycarbonate resin and else.

(2) Method for Producing Polycarbonate Resin Composition

A method for producing the polycarbonate resin composition of the present invention comprises:

preparing a polycarbonate resin comprising a structural unit represented by General formula (1):

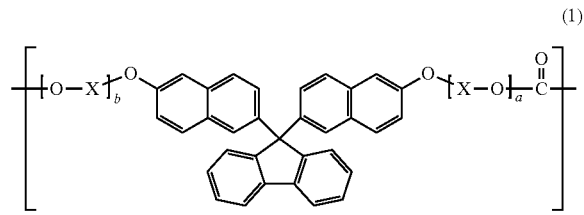

wherein, in General formula (1), X represents a C1-C4 alkylene group, and a and b each independently represent an integer of 1-10; and adding an antioxidant to the polycarbonate resin and then melt-kneading the resultant.

(2-1) Preparing Polycarbonate Resin

According to the method for producing the polycarbonate resin composition of the present invention, first, a polycarbonate resin comprising the structural unit represented by General formula (1) above is prepared. The method for preparing said polycarbonate resin is not particularly limited, and the resin may be prepared by purchasing a presynthesized resin or by chemically synthesizing such a resin.

The polycarbonate resin having the structural unit represented by General formula (1) used for the present invention can be produced by using a compound represented by General formula (4) below as a dihydroxy component and reacting it with a carbonate precursor substance such as carbonate diester:

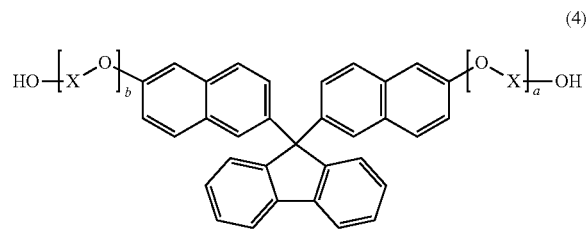

(4)

wherein, in General formula (4), X represents a C1-C4 alkylene group, and a and b each independently represent an integer of 1-10. Specifically, the polycarbonate resin can be produced by making the compound represented by General formula (4) to react with a carbonate precursor substance such as carbonate diester by a melt polycondensation process in the presence of a basic compound catalyst, a transesterification catalyst or a mixed catalyst thereof, or in the absence of a catalyst.

Examples of the compound of General formula (4) include 9,9-bis(hydroxy (poly)alkoxynaphthyl)fluorenes. Examples of the compound of General formula (4) include 9,9-bis[6-(1-hydroxymethoxy)naphthalene-2-yl]fluorene, 9,9-bis[6-(2-hydroxyethoxy)naphthalene-2-yl]fluorene, 9,9-bis[6-(3-hydroxypropoxy)naphthalene-2-yl]fluorene and 9,9-bis[6-(4-hydroxybutoxy)naphthalene-2-yl]fluorene. Among them, 9,9-bis[6-(2-hydroxyethoxy)naphthalene-2-yl]fluorene is favorable. Any one of them may be used alone or two or more of them may be used in combination.

When producing the compound of General formula (4), compounds, wherein either a or b is 0, may be by-produced as impurities. The total content of such impurities in a monomer mainly composed of the compound of General formula (4) is preferably 1000 ppm or less, more preferably 500 ppm or less, still more preferably 200 ppm or less, and particularly preferably 100 ppm or less. Furthermore, other than such impurities, fluorenone, one of the raw materials, may also be comprised as an impurity. The content of fluorenone in a monomer mainly composed of the compound of General formula (4) is preferably 1000 ppm or less, more preferably 100 ppm or less, still more preferably 50 ppm or less, and particularly preferably 10 ppm or less. The fluorenone comprised in a monomer mainly composed of the compound of General formula (4) may remain in the resin after the polymerization. The smaller the content of fluorenone is, the better the hue of the resin becomes, and therefore it is preferred. Although compounds represented by General formula (4), wherein a and b are not identical (i.e., a≠b), are not impurities, the total content thereof in a monomer mainly composed of the compound of General formula (4) is preferably 50 ppm or less and more preferably 20 ppm or less.

The compound of General formula (4) can be produced according to various synthesis methods. For example, as described in Japanese Patent Publication No. 5442800, a 9,9-bis(hydroxynaphthyl)fluorene is obtained by employing: (a) a method in which a fluorenone is reacted with a hydroxynaphthalene in the presence of hydrogen chloride gas and mercaptocarboxylic acid; (b) a method in which 9-fluorenone is reacted with a hydroxynaphthalene in the presence of an acid catalyst (and alkyl mercaptan); (c) a method in which a fluorenone is reacted with a hydroxynaphthalene in the presence of hydrochloric acid and a thiol (mercaptocarboxylic acid or the like); (d) a method in which a fluorenone is reacted with a hydroxynaphthalene in the presence of sulfuric acid and a thiol (mercaptocarboxylic acid or the like), and crystallizing the resultant with a crystallization solvent composed of a hydrocarbon and a polar solvent to produce bisnaphthol fluorene; or the like, and then reacting the 9,9-bis(hydroxynaphthyl)fluorene with compounds corresponding to an [XO]a group and an [XO]b group (alkylene oxide, haloalkanol, etc.), thereby obtaining the compound of General formula (4). For example, 9,9-bis[6-(2-hydroxyethoxy)naphthyl]fluorene may be obtained by reacting 9,9-bis[6-hydroxynaphthyl]fluorene with 2-chloroethanol under alkaline conditions.

Along with the compound of General formula (4), the polycarbonate resin having the structural unit represented by General formula (1) according to the present invention can use an aromatic dihydroxy compound and an aliphatic dihydroxy compound (for example, a dihydroxy compound having a fluorene skeleton and a binaphthol) as dihydroxy components.

Preferably, the polycarbonate resin used for the present invention can be produced by using a compound represented by General formula (5) below and/or a compound represented by General formula (6) below as dihydroxy components along with the above-described compound represented by General formula (4).

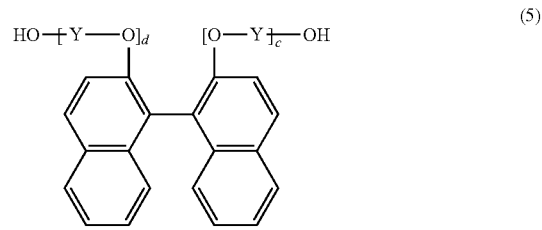

(5)

In General formula (5), Y represents a C1-C4 alkylene group, and c and d each independently represent an integer of 1-10.

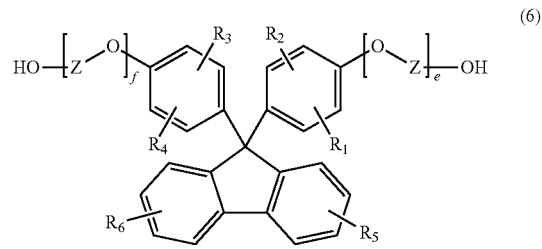

(6)

In General formula (6), Z represents a C1-C4 alkylene group, $R_1$-$R_6$ each independently represent a hydrogen atom, a C1-C20 alkyl group, a C1-C20 alkoxyl group, a C5-C20 cycloalkyl group, a C5-C20 cycloalkoxyl group, a C6-C20 aryl group or a C6-C20 aryloxy group, and e and f each independently represent an integer of 0-5.

Examples of the dihydroxy compound represented by Formula (5) include 2,2'-bis(1-hydroxymethoxy)-1,1'-binaphthalene, 2,2'-bis(2-hydroxyethoxy)-1,1'-binaphthalene, 2,2'-bis(3-hydroxypropyloxy)-1,1'-binaphthalene, and 2,2'-bis(4-hydroxybutoxy)-1,1'-binaphthalene. Among them, 2,2'-bis(2-hydroxyethoxy)-1,1'-binaphthalene (hereinafter, also abbreviated as "BNE") is preferable. Any one of them may be used alone or two or more of them may be used in combination.

When producing the compound of General formula (5), compounds, wherein either c or d is 0, may be by-produced as impurities. The total content of such impurities in a monomer mainly composed of the compound of General formula (5) is preferably 1000 ppm or less, more preferably 500 ppm or less, still more preferably 200 ppm or less, and particularly preferably 100 ppm or less. Furthermore, although compounds represented by General formula (5), wherein c and d are not identical (i.e., c≠d), are not impurities, the total content thereof in a monomer mainly composed of the compound of General formula (5) is preferably 50 ppm or less and more preferably 20 ppm or less.

Examples of the dihydroxy compound represented by Formula (6) include 9,9-bis[4-(2-hydroxyethoxy)phenyl]fluorene, 9,9-bis[4-(2-hydroxyethoxy)-3-methylphenyl]fluorene, 9,9-bis[4-(2-hydroxyethoxy)-3-tert-butylphenyl]fluorene, 9,9-bis[4-(2-hydroxyethoxy)-3-isopropylphenyl]fluorene, 9,9-bis[4-(2-hydroxyethoxy)-3-cyclohexylphenyl]fluorene, and 9,9-bis[4-(2-hydroxyethoxy)-3-phenylphenyl]fluorene (hereinafter, sometimes abbreviated as "BPPEF"). Among them, 9,9-bis[4-(2-hydroxyethoxy)phenyl]fluorene and 9,9-bis[4-(2-hydroxyethoxy)-3-phenylphenyl]fluorene are favorable, and 9,9-bis[4-(2-hydroxyethoxy)-3-phenylphenyl]fluorene (BPPEF) is more favorable. Any one of them may be used alone or two or more of them may be used in combination.

When producing the compound of General formula (6), compounds, wherein either e or f is 0, may be by-produced as impurities. The total content of such impurities in a monomer mainly composed of the compound of General formula (6) is preferably 1000 ppm or less, more preferably 500 ppm or less, still more preferably 200 ppm or less, and particularly preferably 100 ppm or less. Furthermore, although compounds represented by General formula (6), wherein e and f are not identical (i.e., e≠f), are not impurities, the total content thereof in a monomer mainly composed of the compound of General formula (6) is preferably 50 ppm or less and more preferably 20 ppm or less.

Examples of the aromatic dihydroxy compounds that can be used in combination other than those mentioned above include bisphenol A, bisphenol AP, bisphenol AF, bisphenol B, bisphenol BP, bisphenol C, bisphenol E, bisphenol F, bisphenol G, bisphenol M, bisphenol S, bisphenol P, bisphenol PH, bisphenol TMC and bisphenol Z.

Examples of the carbonate diester used for the present invention include diphenyl carbonate, ditolyl carbonate, bis(chlorophenyl)carbonate, m-cresyl carbonate, dimethyl carbonate, diethyl carbonate, dibutyl carbonate and dicyclohexyl carbonate. Among them, diphenyl carbonate is particularly favorable. Diphenyl carbonate is used at a ratio of preferably 0.97-1.20 moles, more preferably 0.98-1.10 moles, and still more preferably 1.00-1.10 moles relative to 1 mole of the total dihydroxy compound.

Among the transesterification catalysts, examples of the basic compound catalysts include, in particular, an alkali metal compound, an alkaline earth metal compound, and a nitrogen-containing compound.

Examples of the alkali metal compound used for the present invention include an organic acid salt, an inorganic salt, an oxide, a hydroxide, a hydride, an alkoxide and the like of alkali metals. Specifically, sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, phenylated boron sodium, sodium benzoate, potassium benzoate, cesium benzoate, lithium benzoate, disodium hydrogen phosphate, dipotassium hydrogen phosphate, dilithium hydrogen phosphate, disodium phenyl phosphate, a disodium salt, a dipotassium salt, a dicesium salt or a dilithium salt of bisphenol A, a sodium salt, a potassium salt, a cesium salt or a lithium salt of phenol, or the like can be used.

Examples of the alkaline earth metal compound include an organic acid salt, an inorganic salt, an oxide, a hydroxide, a hydride, an alkoxide and the like of alkaline earth metal compounds. Specifically, magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate, magnesium phenyl phosphate, or the like can be used.

Examples of the nitrogen-containing compound include quaternary ammonium hydroxide, and a salt, an amine and the like thereof. Specifically, quaternary ammonium hydroxides having an alkyl group, an aryl group or the like, such as tetramethylammonium hydroxide, tetraethylammonium hydroxide, tetrapropylammonium hydroxide, tetrabutylammonium hydroxide and trimethylbenzylammonium hydroxide; tertiary amines such as triethylamine, dimethylbenzylamine and triphenylamine; secondary amines such as diethylamine and dibutylamine; primary amines such as propylamine and butylamine; imidazoles such as 2-methylimidazole, 2-phenylimidazole and benzimidazole; a base or a basic salt such as ammonia, tetramethylammonium borohydride, tetrabutylammonium borohydride, tetrabutylammonium tetraphenylborate and tetraphenylammonium tetraphenylborate, or the like can be used.

The transesterification catalyst is preferably a salt of zinc, tin, zirconium, lead or the like, which may be used alone or in combination.

As the transesterification catalyst, specifically, zinc acetate, zinc benzoate, zinc 2-ethylhexanoate, tin (II) chloride, tin (IV) chloride, tin (II) acetate, tin (IV) acetate, dibutyltin dilaurate, dibutyltin oxide, dibutyltin dimethoxide, zirconium acetylacetonate, zirconium oxyacetate, zirconium tetrabutoxide, lead (II) acetate, lead (IV) acetate or the like can be used.

These catalysts are used at a ratio of $1 \times 10^{-9}$ to $1 \times 10^{-3}$ moles, and preferably $1 \times 10^{-7}$ to $1 \times 10^{-4}$ moles relative to 1 mole of the total dihydroxy compound.

The melt polycondensation process takes place by carrying out melt polycondensation using the above-described raw materials and catalyst by heating under normal or reduced pressure while removing the by-products by transesterification.

Melt polycondensation with this composition system preferably takes place by melting and then allowing reaction between the compound represented by General formula (4) and carbonate diester in a reactor while retaining the by-produced monohydroxy compound. For the retention, the reaction apparatus may be closed, or the pressure may be controlled, i.e., reduced or elevated. The reaction time in this step is 20 minutes or longer and 240 minutes or shorter, preferably 40 minutes or longer and 180 minutes or shorter, and particularly preferably 60 minutes or longer and 150 minutes or shorter. In this regard, if the by-produced monohydroxy compound is distilled away immediately after it is generated, the content of a high-molecular-weight body in the resulting polycarbonate resin will be small. If, however, the by-produced monohydroxy compound is retained in the reactor for a certain period of time, the content of the high-molecular-weight body in the resulting polycarbonate resin will be large.

The melt polycondensation reaction may be carried out in either a continuous or batch mode. The reaction apparatus used for the reaction may be a vertical type reaction apparatus equipped with anchor-shaped stirring blades, Max-blend stirring blades, helical ribbon-shaped stirring blades or the like, a horizontal type reaction apparatus equipped with paddle blades, lattice blades, spectacle-shaped blades or the like, or an extruder type reaction apparatus equipped with a screw. In addition, such reaction apparatuses are preferably used in a suitable combination according to the viscosity of the polymer.

According to the method for producing a polycarbonate resin used for the present invention, the catalyst may be removed or deactivated at the end of the polymerization reaction in order to maintain the thermal stability and hydrolysis stability. A method for deactivating the catalyst can preferably be conducted by adding a known acidic substance. Specifically, as such an acidic substance: an ester such as butyl benzoate; an aromatic sulfonic acid such as p-toluenesulfonic acid; an aromatic sulfonate ester such as butyl p-toluenesulfonic acid or hexyl p-toluenesulfonic acid; a phosphoric acid such as phosphorous acid, phosphoric acid or phosphonic acid; a phosphite ester such as triphenyl phosphite, monophenyl phosphite, diphenyl phosphite, diethyl phosphite, di-n-propyl phosphite, di-n-butyl phosphite, di-n-hexyl phosphite, dioctyl phosphite or monooctyl phosphite; a phosphate ester such as triphenyl phosphate, diphenyl phosphate, monophenyl phosphate, dibutyl phosphate, dioctyl phosphate or monooctyl phosphate; a phosphonic acid such as diphenyl phosphonate, dioctyl phosphonate or dibutyl phosphonate; a phosphonate ester such as diethylphenyl phosphonate; a phosphine such as triphenyl phosphine or bis(diphenylphosphino)ethane; a boric acid such as boric acid or phenylboric acid; an aromatic sulfonic acid salt such as dodecylbenzene sulfonate·tetrabutyl phosphonium salt; an organic halide such as stearic acid chloride, benzoyl chloride or p-toluenesulfonic acid chloride; an alkyl sulfate such as dimethyl sulfate; an organic halide such as benzyl chloride, can favorably be used. These deactivating agents are used in an amount of 0.01-50 times and preferably 0.3-20 times the molar amount of the catalyst. If the amount is less than 0.01 times the molar amount of the catalyst, the deactivating effect will be insufficient, which is undesirable. On the other hand, if the amount is more than 50 times the molar amount of the catalyst, the heat resistance of the resin will be poor and the molded article is likely to acquire coloring, which are undesirable.

Subsequent to the deactivation of the catalyst, a step of devolatilizing and removing the low-boiling-point compound in the polymer under a pressure of 0.1-1 mmHg at a temperature of 200-350° C. may be provided. For this step, a horizontal-type apparatus equipped with stirring blades that have excellent surface renewal capacity such as paddle blades, lattice blades, spectacle-shaped blades or the like, or a thin-film evaporator can favorably be used.

It is desirable that the content of the foreign matters in the polycarbonate resin used for the present invention is as small as possible, and for which filtration of the molten raw materials, filtration of the catalyst solution or the like can favorably be performed. The mesh of the filter is preferably 5 μm or less and more preferably 1 μm or less. Moreover, the generated resin can preferably be filtrated with a polymer filter. The mesh of the polymer filter is preferably 100 μm or less and more preferably 30 μm or less. Needless to say, the step of collecting the resin pellets should be carried out in a low dust environment, which is preferably Class 6 or lower and more preferably Class 5 or lower.

In another aspect of the present invention, in order to produce a polycarbonate resin comprising the structural units represented by General formulae (1)-(3), or a polycarbonate resin comprising the structural units represented by General formulae (1) and (2), a copolymer comprising the structural units represented by General formulae (1)-(3) or the structural units represented by General formulae (1) and (2) may be produced by using the compounds represented by General formulae (4)-(6), or the compounds represented by General formulae (4)-(6) may be separately polymerized to produce the polycarbonate resin as a ternary resin or a binary resin that comprises homopolymers respectively consisting of such structural units. Alternatively, a copolymer comprising the structural units represented by General formulae (1) and (2) and a homopolymer comprising the structural unit represented by General formula (3) may be polymerized and then blended, or a copolymer comprising the structural units represented by General formulae (1) and (2) and a copolymer comprising the structural units represented by General formulae (1) and (3) may be polymerized and then blended.

(2-2) Adding Antioxidant to Polycarbonate Resin and then Melt-Kneading the Resultant After preparing the polycarbonate resin comprising the structural unit represented by General formula (1), an antioxidant is added to said polycarbonate resin. The method of addition is not particularly limited and any method may be employed. For example, an antioxidant may be added afterward to a container comprising the polycarbonate resin, or the polycarbonate resin may be placed into a container into which an antioxidant has been placed in advance, or the polycarbonate resin and an antioxidant may simultaneously be placed into a container. Specifically, a Turnbull mixer, a Henschel mixer, a ribbon blender, a super mixer, a roll mixer or a tumbler mixer may be used to allow an antioxidant to attach to pellets of the polycarbonate resin. According to such a method of addition, an antioxidant can be dispersed uniformly in the polycarbonate resin composition, which is favorable because heat history can be reduced. Alternatively, pellets of the polycarbonate resin may be mixed with pellets obtained by melt-kneading a portion of the polycarbonate resin with an antioxidant at a high concentration.

After adding the antioxidant to the polycarbonate resin, they are melt-kneaded. The melt-kneading method is not particularly limited and any method may be employed. For example, melt-kneading can be carried out by a known kneading method using a single- or twin-screw extruder, a Banbury mixer, a static mixer or the like. The polycarbonate resin may be pelletized before adding the antioxidant. The pelletizing method is not particularly limited and any method may be employed. Moreover, the polycarbonate resin resulting from melt-kneading may be pelletized, and any method can be employed for this pelletization.

(3) Optical Lens

Since an optical lens produced with the polycarbonate resin composition of the present invention has a high refractive index, a low Abbe number and high thermal stability, it can be used and is remarkably useful in the fields in which expensive high-refractive-index glass lenses such as telescopes, binoculars, video projectors or the like have conventionally been used. According to needs, it is preferably used in a form of an aspheric lens. Since an aspheric lens is capable of reducing the spherical aberration to substantially zero with a single lens, there is no need of combining multiple spherical lenses to eliminate the spherical aberration, which enables reduction in the weight and the production cost. Therefore, an aspheric lens is particularly useful as a camera lens among the optical lenses.

An optical lens may be molded, for example, by any method such as an injection molding process, a compression molding process or an injection compression molding process. According to the present invention, an aspheric lens having a high refractive index and low birefringence, which requires technically difficult processing in case of a glass lens, can be obtained more conveniently.

In order to avoid mixing of foreign matters into the optical lens as much as possible, the molding environment should, of course, be a low dust environment, which is preferably Class 6 or lower and more preferably Class 5 or lower.

(4) Optical Film

Since an optical film produced by using the polycarbonate resin composition of the present invention has excellent transparency and thermal stability, it can suitably be used as a film for a liquid crystal substrate, an optical memory card or the like.

In order to avoid mixing of foreign matters into the optical film as much as possible, the molding environment should, of course, be a low dust environment, which is preferably Class 6 or lower and more preferably Class 5 or lower.

EXAMPLES

Hereinafter, the present invention will be described by way of examples, but the present invention should not be limited in any way to these examples. Herein, the measures in the examples were determined by the following methods and instruments.

1) Weight-Average Molecular Weight (Mw) in Terms of Polystyrene:

Gel permeation chromatograph (GPC) was employed to generate a calibration curve, using tetrahydrofuran as a developing solvent and a standard polystyrene having a known molecular weight (molecular weight distribution=1). Based on this calibration curve, Mw was calculated from the retention time of GPC.

2) Glass Transition Temperature (Tg):

A differential scanning calorimeter (DSC (highly sensitive differential scanning calorimeter DSC7000X)) was used for the measurement. After melting once and then cooling for solidification in the differential scanning calorimeter (DSC), Tg was determined during the second heating process (second run), where the rates for raising and lowering the temperature were each set to 10° C./min.

3) Refractive Index (nD):

Refractive index was determined for a 0.1 mm-thick film composed of the polycarbonate copolymer according to the method of JIS-K-7142 using an Abbe refractometer. The 0.1-mm film was obtained by press molding.

4) Abbe Number (ν):

Refractive indexes of a 0.1 mm-thick film composed of the polycarbonate copolymer were determined at 23° C. and at wavelengths of 486 nm, 589 nm and 656 nm with an Abbe refractometer, and the Abbe number was further calculated using the following equation. The 0.1-mm film was obtained by press molding.

$$\nu = (nD-1)/(nF-nC)$$

nD: Refractive index at wavelength of 589 nm
nC: Refractive index at wavelength of 656 nm
nF: Refractive index at wavelength of 486 nm 5) Total Light Transmittance:

A 3 mm-thick plate composed of the polycarbonate resin was prepared for determining the b value below, and total light transmittance thereof was determined according to the method of JIS-K-7361-1 using SE2000-type spectrocolorimeter manufactured by Nippon Denshoku Industries Co., Ltd.

6) b Value:

After drying the resin sample under vacuum at 120° C. for 4 hours, the resultant was subjected to injection molding using an injection molding machine (FANUC ROBOSHOT α-S30iA) at a cylinder temperature of 270° C. and a mold temperature of (Tg-10° C.) to obtain a disc-shaped test plate piece having a diameter of 50 mm and a thickness of 3 mm. This plate piece was used to determine the b value according to JIS K7105. A smaller b value indicates weaker yellowness, meaning better hue. SE2000-type spectrocolorimeter manufactured by Nippon Denshoku Industries Co., Ltd. was used to measure the molded plate. The b value after the heat retention was determined in the same manner as the aforementioned method, for the polycarbonate resin composition that was dried at 110° C. for 5 hours, then retained for 10 minutes in a Koka-type flow tester CFT-500D (manufactured by Shimadzu Corporation) that was heated to 285° C., and taken out after the retention.

7) Weight-Average Molecular Weight (Mw) in Terms of Polystyrene after PCT Test (Pressure Cooker Test):

After drying the resin sample under vacuum at 120° C. for 4 hours, the resultant was subjected to injection molding using an injection molding machine (FANUC ROBOSHOT a-S30iA) at a cylinder temperature of 270° C. and a mold temperature of (Tg-10° C.) to obtain a disc-shaped test plate piece having a diameter of 50 mm and a thickness of 3 mm. This plate piece was retained in PC-305SIII manufactured by HIRAYAMA under the conditions of 120° C., 0.2 Mpa and 100% RH for 20 hours, and then the plate piece was taken out to determine Mw in the same manner as the method described in 1) above.

8) Weight-Average Molecular Weight (Mw) in Terms of Polystyrene after Heat Retention:

The polycarbonate resin composition was dried at 110° C. for 5 hours and then retained for 10 minutes in a Koka-type flow tester CFT-500D (manufactured by Shimadzu Corporation) heated to 285° C. The polycarbonate resin composition was taken out after the retention to determine Mw in the same manner as the method described in 1) above.

9) Amounts of Residual Phenol and Residual Diphenyl Carbonate (DPC):

1.0 g of the polycarbonate resin was accurately weighed and dissolved in 10 ml of dichloromethane, and the resultant was gradually added to 100 ml of methanol while stirring to reprecipitate the resin. After sufficient stirring, the precipitate was filtrated and the filtrate was concentrated by an evaporator to obtain a solid, to which 1.0 g of an accurately weighed standard substance solution was added. 1 g of chloroform was further added thereto for dilution, and the diluted solution was quantified by GC-MS.

Standard substance solution: 200 ppm, chloroform solution of 2,4,6-trimethylphenol Measurement apparatus (GC-MS): Agilent HP6890/5973MSD Column: capillary column DB-5MS, 30 m×0.25 mm I.D., film thickness 0.5 μm Conditions for raising temperature: 50° C. (5 min hold) to 300° C. (15 min hold), 10° C./min Temperature at inlet: 300° C., amount of injection: 1.0 μl (split ratio 25)

Ionization method: EI method

Carrier gas: He, 1.0 ml/min

Aux temperature: 300° C.

Mass scanning range: 33-700

Production of Polycarbonate Resin

Manufacturing Example 1

As raw materials, 8100 g (15.038 moles) of 9,9-bis[6-(2-hydroxyethoxy)naphthalene-2-yl]fluorene (hereinafter, sometimes abbreviated as "BNEF"), 19600 g (33.180 moles) of 9,9-bis[4-(2-hydroxyethoxy)-3-phenylphenyl]fluorene (hereinafter, sometimes abbreviated as "BPPEF"), 10500 g (49.016 moles) of diphenyl carbonate (hereinafter, sometimes abbreviated as "DPC") and 0.034 g ($4.0 \times 10^{-4}$ moles) of sodium hydrogen carbonate were placed into a 50-L reactor equipped with a stirrer and a distillation apparatus, and heated to 180° C. under nitrogen atmosphere at 760 mmHg. Thirty minutes after the start of heating, complete dissolution of the raw materials was confirmed and then stirring was performed for 120 minutes under the same conditions. Thereafter, the degree of reducing the pressure was adjusted to 200 mmHg and, at the same time, the temperature was raised to 200° C. at a rate of 60° C./hr. At this point, initiation of the distillation of the by-produced phenol was confirmed. Subsequently, reaction was allowed for 40 minutes while maintaining the temperature at 200° C. Furthermore, the temperature was raised to 230° C. at a rate of 75° C./hr. Ten minutes after the end of raising the temperature, the degree of reducing the pressure was set to 1 mmHg or less by spending 2 hours while maintaining the temperature. Subsequently, the temperature was raised to 245° C. at a rate of 60° C./hr and stirring was carried out for another 50 minutes. At the end of the reaction, nitrogen was introduced into the reactor to restore normal pressure, and the generated polycarbonate resin was pelletized and taken out therefrom. The physical properties of the resulting polycarbonate resin (copolymer) (PC-1) are shown in the table.

Manufacturing Example 2

The same procedure as Manufacturing example 1 was conducted except that 8100 g (15.038 moles) of BNEF, 12500 g (33.383 moles) of 2,2'-bis(2-hydroxyethoxy)-1,1'-binaphthalene (hereinafter, sometimes abbreviated as "BNE"), 10500 g (49.016 moles) of DPC and 0.034 g ($4.0 \times 10^{-4}$ moles) of sodium hydrogen carbonate were used as the raw materials. The physical properties of the resulting polycarbonate copolymer (PC-2) are shown in the table.

Manufacturing Example 3

The same procedure as Manufacturing example 1 was conducted except that 8100 g (15.038 moles) of BNEF, 14500 g (33.066 moles) of 9,9-bis[4-(2-hydroxyethoxy)phenyl]fluorene (hereinafter, sometimes abbreviated as "BPEF"), 10500 g (49.016 moles) of DPC and 0.034 g ($4.0 \times 10^{-4}$ moles) of sodium hydrogen carbonate were used as the raw material. The physical properties of the resulting polycarbonate resin (copolymer) (PC-3) are shown in the table.

Manufacturing Example 4

The same procedure as Manufacturing example 1 was conducted except that 11500 g (21.350 moles) of BNEF, 4200 g (11.217 moles) of BNE, 9100 g (15.405 moles) of BPPEF, 10500 g (49.016 moles) of DPC and 0.034 g ($4.0 \times 10^{-4}$ moles) of sodium hydrogen carbonate were used as the raw material. The physical properties of the resulting polycarbonate resin (copolymer) (PC-4) are shown in the table.

Manufacturing Example 5

The same procedure as Manufacturing example 1 was conducted except that 8000 g (14.852 moles) of BNEF, 7500 g (20.030 moles) of BNE, 7600 g (12.866 moles) of BPPEF, 10500 g (49.016 moles) of DPC and 0.034 g ($4.0 \times 10^{-4}$ moles) of sodium hydrogen carbonate were used as the raw material. The physical properties of the resulting polycarbonate resin (copolymer) (PC-5) are shown in the table.

Manufacturing Example 6

The same procedure as Manufacturing example 1 was conducted except that 6900 g (12.810 moles) of BNEF, 9300 g (24.837 moles) of BNE, 5900 g (9.988 moles) of BPPEF, 10500 g (49.016 moles) of DPC and 0.034 g ($4.0 \times 10^{4}$ moles) of sodium hydrogen carbonate were used as the raw material. The physical properties of the resulting polycarbonate resin (copolymer) (PC-6) are shown in the table.

Manufacturing Example 7

The same procedure as Manufacturing example 1 was conducted except that 8000 g (14.852 moles) of BNEF, 7500 g (20.030 moles) of BNE, 5600 g (12.770 moles) of BPEF, 10500 g (49.016 moles) of DPC and 0.034 g ($4.0 \times 10^{-4}$ moles) of sodium hydrogen carbonate were used as the raw material. The physical properties of the resulting polycarbonate resin (copolymer) (PC-7) are shown in the table.

Manufacturing Example 8

The same procedure as Manufacturing example 1 was conducted except that 9300 g (24.837 moles) of BNE, 5615 g (12.804 moles) of BPEF, 5900 g (9.988 moles) of BPPEF, 10500 g (49.016 moles) of DPC and 0.034 g ($4.0 \times 10^{-4}$ moles) of sodium hydrogen carbonate were used as the raw material. The physical properties of the resulting polycarbonate resin (copolymer) (PC-8) are shown in the table.

TABLE 1

| | | Composition ratio | | | | Physical properties of polycarbonate resin | |
|---|---|---|---|---|---|---|---|
| | | BNEF mol % | BNE mol % | BPEF mol % | BPPEF mol % | Mw | Tg °C. |
| Manufacturing example 1 | PC-1 | 31 | 0 | 0 | 69 | 34000 | 158 |
| Manufacturing example 2 | PC-2 | 31 | 69 | 0 | 0 | 35000 | 136 |
| Manufacturing example 3 | PC-3 | 31 | 0 | 69 | 0 | 34000 | 158 |
| Manufacturing example 4 | PC-4 | 45 | 22 | 0 | 33 | 34000 | 151 |
| Manufacturing example 5 | PC-5 | 31 | 42 | 0 | 27 | 34000 | 142 |
| Manufacturing example 6 | PC-6 | 27 | 52 | 0 | 21 | 34000 | 138 |
| Manufacturing example 7 | PC-7 | 31 | 42 | 27 | 0 | 35000 | 150 |
| Manufacturing example 8 | PC-8 | 0 | 52 | 27 | 21 | 34000 | 132 |

| | | Physical properties of polycarbonate resin | | | | |
|---|---|---|---|---|---|---|
| | | Refractive index (nD) | Abbe number (ν) | Total light transmittance % | b value | Mw after PCT test |
| Manufacturing example 1 | PC-1 | 1.663 | 20 | 87 | 3.9 | 32400 |
| Manufacturing example 2 | PC-2 | 1.675 | 19 | 87 | 4.4 | 33300 |
| Manufacturing example 3 | PC-3 | 1.655 | 21 | 88 | 3.6 | 32300 |
| Manufacturing example 4 | PC-4 | 1.671 | 20 | 88 | 4.6 | 33300 |
| Manufacturing example 5 | PC-5 | 1.670 | 20 | 88 | 4.4 | 33300 |
| Manufacturing example 6 | PC-6 | 1.670 | 19 | 87 | 4.2 | 33300 |
| Manufacturing example 7 | PC-7 | 1.667 | 20 | 88 | 3.9 | 34300 |
| Manufacturing example 8 | PC-8 | 1.657 | 21 | 88 | 6.5 | 28200 |

BNEF: 9,9-bis(6-(2-hydroxyethoxy)naphthalene-2-yl)fluorene
BNE: 2,2'-bis(2-hydroxyethoxy)-1,1'-binaphthalene
BPEF: 9,9-bis(4-(2-hydroxyethoxy)phenyl)fluorene
BPPEF: 9,9-bis(4-(2-hydroxyethoxy)-3-phenylphenyl)fluorene The structural formulae of BNEF, BNE, BPEF and BPPEF used in the examples are shown below, respectively.

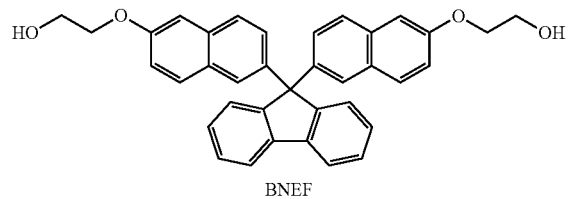

BNEF

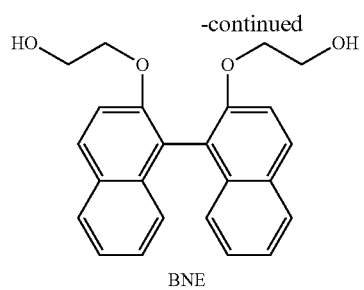

BNE

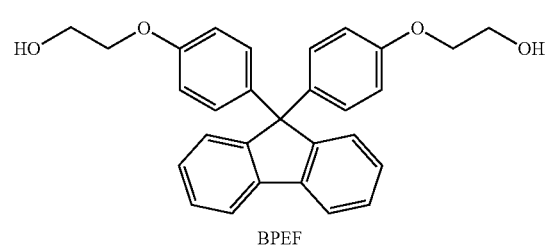

BPEF

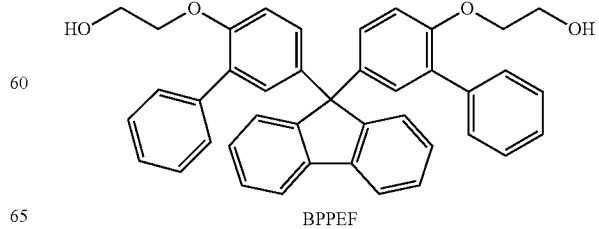

BPPEF

Production of Polycarbonate Resin Composition

Example 1-1

The polycarbonate resin (PC-1) obtained in Manufacturing example 1 was blended with antioxidants whose types and added amounts in mass ratios are indicated in the table, and mixed (added) in a tumbler for 20 minutes. Thereafter, the resultant was fed to a twin-screw extruder having a single vent (TEX30HSST) manufactured by The Japan Steel Works, Ltd., and melt-kneaded under the conditions of a screw rotation speed of 200 rpm, a discharge rate of 20 kg/hour and a barrel temperature of 260° C. The melt-kneaded polycarbonate resin composition was extruded into a strand, which was rapidly cooled in a water tank and pelletized using a pelletizer to obtain pellets of the polycarbonate resin composition. The physical properties of the resulting polycarbonate resin composition are shown in Table 2.

Examples 1-2, 2 to 4, 5-1 to 5-6 and 6 to 8, and Comparative examples 1 and 3

The respective polycarbonate resin compositions were obtained in the same manner as Example 1-1 except that the polycarbonate resin, and the types and the added amounts of the antioxidants were altered as shown in Table 2. The physical properties of the resulting polycarbonate resin compositions are shown in Table 2. Here, the amounts of the residual phenol and the residual DPC were both 100 ppm in the polycarbonate resin composition of Example 5-1.

Comparative Examples 1-1 and 2

In Comparative example 1-1, a polycarbonate resin composition was prepared and evaluated in the same manner as Comparative example 1 except that no antioxidant was added. In Comparative example 2, a polycarbonate resin composition was prepared and evaluated in the same manner as Example 5-1 except that no antioxidant was added.

In Table 2, "Mw retaining rate after heat retention" refers to the percentage rate of change in the "Mw of the polycarbonate resin comprised in the polycarbonate resin composition after the heat retention test" relative to the "Mw of the polycarbonate resin", which can be determined by dividing the "Mw of the polycarbonate resin comprised in the polycarbonate resin composition after the heat retention test" by the "Mw of the polycarbonate resin". "Increase in b value after heat retention" refers to a percentage increase in the "b value of the polycarbonate resin composition after the heat retention test" relative to the "b value of the polycarbonate resin", which can be determined by dividing the difference between the "b value of the polycarbonate resin composition after the heat retention test" and the "b value of the polycarbonate resin" by the "b value of the polycarbonate resin". "Mw retaining rate after PCT test" refers to a percentage rate of change in the "Mw of the polycarbonate resin comprised in the polycarbonate resin composition after the PCT test" relative to the "Mw of the polycarbonate resin", which can be determined by dividing the "Mw of the polycarbonate resin comprised in the polycarbonate resin composition after the PCT test" by the "Mw of the polycarbonate resin". As can be appreciated from the results shown in Table 2, the polycarbonate resin composition which comprised a polycarbonate resin comprising a specific structural unit and a specific amount of an antioxidant had a high molecular-weight retaining rate and a small increase in the b value after the heat retention, and a high molecular-weight retaining rate after the PCT test. Therefore, the polycarbonate resin composition which comprised a polycarbonate resin comprising a specific structural unit and a specific amount of an antioxidant was found to have high thermal stability. On the other hand, Comparative example 1 which did not comprise the structural unit of General formula (1) had poor thermal stability and Comparative example 1-1 without an antioxidant had further poor thermal stability. Moreover, since the added amount of the antioxidant was not within the prescribed ranges in Comparative examples 2 and 3, their thermal stability was found to be insufficient.

TABLE 2

| | | Additive (antioxidant) | | | | | |
| | | Phosphite-based antioxidant | | | Phenol-based antioxidant | | |
| | Polycarbonate resin | Adekastab PEP36 ppm | Adekastab 1500 ppm | Adekastab 2112 ppm | Adekastab AO60 ppm | Adekastab AO80 ppm | Adekastab AO50 ppm |
| --- | --- | --- | --- | --- | --- | --- | --- |
| Example 1-1 | PC-1 | 300 | 0 | 0 | 1000 | 0 | 0 |
| Example 1-2 | PC-1 | 0 | 0 | 300 | 0 | 0 | 1000 |
| Example 2 | PC-2 | 300 | 0 | 0 | 1000 | 0 | 0 |
| Example 3 | PC-3 | 300 | 0 | 0 | 1000 | 0 | 0 |
| Example 4 | PC-4 | 300 | 0 | 0 | 1000 | 0 | 0 |
| Example 5-1 | PC-5 | 300 | 0 | 0 | 1000 | 0 | 0 |
| Example 5-2 | PC-5 | 0 | 300 | 0 | 0 | 1000 | 0 |
| Example 5-3 | PC-5 | 1000 | 0 | 0 | 300 | 0 | 0 |
| Example 5-4 | PC-5 | 0 | 0 | 300 | 0 | 0 | 1000 |
| Example 5-5 | PC-5 | 300 | 0 | 0 | 1500 | 0 | 0 |
| Example 5-6 | PC-5 | 300 | 0 | 0 | 2500 | 0 | 0 |
| Example 6 | PC-6 | 300 | 0 | 0 | 1000 | 0 | 0 |
| Example 7 | PC-7 | 300 | 0 | 0 | 1000 | 0 | 0 |

TABLE 2-continued

| | Polycarbonate resin | | | | | | |
|---|---|---|---|---|---|---|---|
| Example 8 | PC-5 | 0 | 0 | 0 | 1300 | 0 | 0 |
| Comparative example 1 | PC-8 | 300 | 0 | 0 | 1000 | 0 | 0 |
| Comparative example 1-1 | PC-8 | 0 | 0 | 0 | 0 | 0 | 0 |
| Comparative example 2 | PC-5 | 0 | 0 | 0 | 0 | 0 | 0 |
| Comparative example 3 | PC-5 | 300 | 0 | 0 | 3000 | 0 | 0 |

| | | Physical properties of polycarbonate resin composition[1] | | | | | | |
|---|---|---|---|---|---|---|---|---|
| | Polycarbonate resin | Mw | Tg °C. | Refractive index (nD) | Abbe number (ν) | Total light transmittance % | Mw after heat retention | b value | Mw after PCT test |
| Example 1-1 | PC-1 | 34000 | 158 | 1.663 | 20 | 87 | 30600 | 4.3 | 32600 |
| Example 1-2 | PC-1 | 34000 | 158 | 1.663 | 20 | 87 | 30600 | 4.3 | 32600 |
| Example 2 | PC-2 | 35000 | 136 | 1.675 | 19 | 87 | 31500 | 4.8 | 33600 |
| Example 3 | PC-3 | 34000 | 158 | 1.655 | 21 | 88 | 30600 | 4.0 | 32700 |
| Example 4 | PC-4 | 34000 | 151 | 1.671 | 20 | 88 | 32300 | 4.8 | 33500 |
| Example 5-1 | PC-5 | 34000 | 142 | 1.670 | 20 | 88 | 33500 | 4.5 | 33600 |
| Example 5-2 | PC-5 | 34000 | 142 | 1.670 | 20 | 88 | 32800 | 4.5 | 33600 |
| Example 5-3 | PC-5 | 34000 | 142 | 1.670 | 20 | 88 | 32900 | 4.5 | 33600 |
| Example 5-4 | PC-5 | 34000 | 142 | 1.670 | 20 | 88 | 32700 | 4.5 | 33600 |
| Example 5-5 | PC-5 | 34000 | 142 | 1.670 | 20 | 88 | 32700 | 4.6 | 33500 |
| Example 5-6 | PC-5 | 34000 | 141 | 1.669 | 20 | 88 | 32600 | 4.7 | 33400 |
| Example 6 | PC-6 | 34000 | 138 | 1.670 | 19 | 87 | 33400 | 4.3 | 33600 |
| Example 7 | PC-7 | 35000 | 150 | 1.667 | 20 | 88 | 33200 | 4.1 | 34500 |
| Example 8 | PC-5 | 34000 | 142 | 1.670 | 20 | 85 | 30500 | 5.2 | 33500 |
| Comparative example 1 | PC-8 | 34000 | 132 | 1.657 | 21 | 88 | 29900 | 7.8 | 29000 |
| Comparative example 1-1 | PC-8 | 33900 | 132 | 1.657 | 21 | 88 | 28800 | 7.8 | 28900 |
| Comparative example 2 | PC-5 | 33900 | 142 | 1.670 | 20 | 85 | 29900 | 6.2 | 29900 |
| Comparative example 3 | PC-5 | 34000 | 140 | 1.668 | 20 | 84 | 30200 | 5.5 | 32500 |

| | Polycarbonate resin | Rate of change in physical properties of polycarbonate resin composition[1] | | |
|---|---|---|---|---|
| | | Mw retaining rate after heat retention % | Increase in b value % | Mw retaining rate after PCT test % |
| Example 1-1 | PC-1 | 90.0 | 10.3 | 95.9 |
| Example 1-2 | PC-1 | 90.0 | 10.3 | 95.9 |
| Example 2 | PC-2 | 90.0 | 9.1 | 96.0 |
| Example 3 | PC-3 | 90.0 | 11.1 | 96.2 |
| Example 4 | PC-4 | 95.0 | 5.0 | 98.5 |
| Example 5-1 | PC-5 | 98.5 | 2.3 | 98.8 |
| Example 5-2 | PC-5 | 96.5 | 2.3 | 98.8 |
| Example 5-3 | PC-5 | 96.8 | 2.3 | 98.8 |
| Example 5-4 | PC-5 | 96.2 | 2.3 | 98.8 |
| Example 5-5 | PC-5 | 96.2 | 4.5 | 98.5 |
| Example 5-6 | PC-5 | 95.9 | 6.8 | 98.2 |
| Example 6 | PC-6 | 98.2 | 2.4 | 98.8 |
| Example 7 | PC-7 | 94.9 | 5.1 | 98.6 |
| Example 8 | PC-5 | 89.7 | 8.3 | 98.5 |
| Comparative example 1 | PC-8 | 87.9 | 20.0 | 85.3 |
| Comparative example 1-1 | PC-8 | 84.7 | 20.0 | 85.0 |
| Comparative example 2 | PC-5 | 87.9 | 29.2 | 87.9 |
| Comparative example 3 | PC-5 | 88.8 | 25.0 | 95.6 |

[1] Among the "Physical properties of polycarbonate resin composition", "Molecular weight (Mw)" refers to a molecular weight of the polycarbonate comprised in the resin composition

The invention claimed is:

1. A polycarbonate resin composition comprising a polycarbonate resin and an antioxidant, wherein the polycarbonate resin comprises a structural unit represented by General formula (1) below:

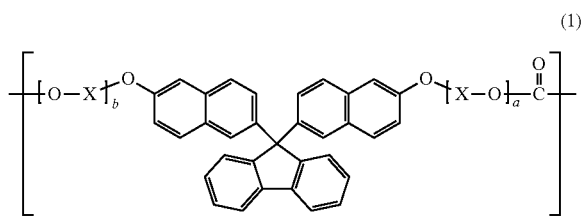

(1)

wherein, in General formula (1), X represents a C1-C4 alkylene group, and a and b each independently represent an integer of 1-10,
and the content of the antioxidant is 1-3000 ppm, and
wherein the antioxidant comprises a combination of a phosphite-based antioxidant and a phenol-based antioxidant.

2. The composition according to claim 1, wherein the polycarbonate resin further comprises a structural unit represented by General formula (2) and/or (3) below:

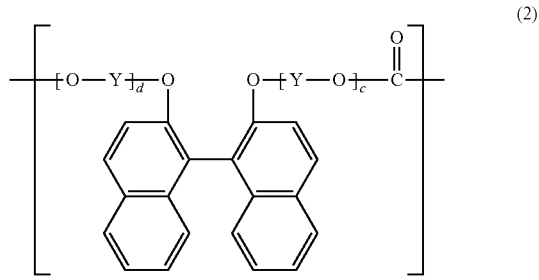

(2)

wherein, in General formula (2), Y represents a C1-C4 alkylene group, and c and d each independently represent an integer of 1-10; and

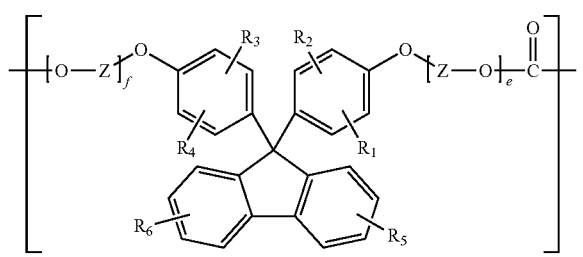

(3)

wherein, in General formula (3), Z represents a C1-C4 alkylene group, $R_1$-$R_6$ each independently represent a hydrogen atom, a C1-C20 alkyl group, a C1-C20 alkoxyl group, a C5-C20 cycloalkyl group, a C5-C20 cycloalkoxyl group, a C6-C20 aryl group or a C6-C20 aryloxy group, and e and f each independently represent an integer of 0-5.

3. The composition according to claim 1, wherein, in General formula (1), X is a C2 alkylene group, and a and b are each independently 1.

4. The composition according to claim 2, wherein, in General formula (2), Y is a C2 alkylene group, and c and d are each independently 1.

5. The composition according to claim 2, wherein, in General formula (3), Z is a C2 alkylene group, $R_1$-$R_6$ are each independently a hydrogen atom or a phenyl group, and e and f are each independently 1.

6. The composition according to claim 1, wherein the proportion of the structural unit represented by General formula (1) is 10-50 mol % in the polycarbonate resin.

7. The composition according to claim 2, wherein the proportion of the structural unit represented by General formula (2) is 20-70 mol % in the polycarbonate resin.

8. The composition according to claim 2, wherein the proportion of the structural unit represented by General formula (3) is 10-70 mol % in the polycarbonate resin.

9. The composition according to claim 1, wherein the weight-average molecular weight of the polycarbonate resin is 10,000-100,000.

10. A method for producing a polycarbonate resin composition, comprising:
preparing a polycarbonate resin comprising a structural unit represented by General formula (1) below:

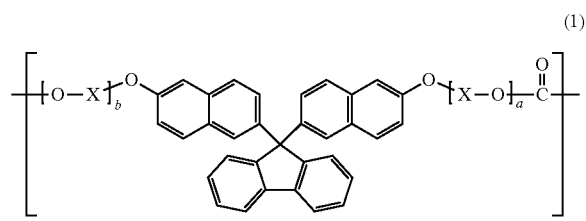

(1)

wherein, in General formula (1), X represents a C1-C4 alkylene group, and a and b each independently represent an integer of 1-10; and
adding an antioxidant to the polycarbonate resin and then melt-kneading the resultant,
wherein the antioxidant comprises a combination of a phosphite-based antioxidant and a phenol-based antioxidant.

11. A molded article comprising the resin composition according to claim 1.

12. The molded article according to claim 11, wherein the molded article is an optical film.

13. The molded article according to claim 11, wherein the molded article is an optical lens.

* * * * *